United States Patent
Jiang et al.

(10) Patent No.: US 8,842,594 B2
(45) Date of Patent: Sep. 23, 2014

(54) MULTICAST BROADCAST SINGLE FREQUENCY NETWORK SUBFRAME, AND USER DATA CHANNEL TRANSMISSION METHOD AND DEVICE

(75) Inventors: Jing Jiang, Shenzhen (CN); Feng Bi, Shenzhen (CN); Yunfeng Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 310 days.

(21) Appl. No.: 13/257,858

(22) PCT Filed: Nov. 19, 2009

(86) PCT No.: PCT/CN2009/075035
§ 371 (c)(1),
(2), (4) Date: Dec. 2, 2011

(87) PCT Pub. No.: WO2010/148604
PCT Pub. Date: Dec. 29, 2010

(65) Prior Publication Data
US 2012/0076063 A1  Mar. 29, 2012

(30) Foreign Application Priority Data
Jun. 23, 2009 (CN) .......................... 2009 1 0142233

(51) Int. Cl.
*H04H 20/71* (2008.01)
*H04L 27/26* (2006.01)
*H04W 72/00* (2009.01)
*H04L 5/00* (2006.01)

(52) U.S. Cl.
CPC ......... *H04L 27/2607* (2013.01); *H04W 72/005* (2013.01); *H04L 5/003* (2013.01); *H04L 5/0035* (2013.01); *H04L 5/0007* (2013.01)
USPC ........................................... 370/312; 370/329

(58) Field of Classification Search
USPC ................................................. 370/312, 329
See application file for complete search history.

(56) References Cited

U.S. PATENT DOCUMENTS

2008/0084845 A1  4/2008  Kuchibhotla et al.
2009/0252075 A1*  10/2009  Ji et al. .......................... 370/312
(Continued)

FOREIGN PATENT DOCUMENTS

| CN | 101060513 A | 10/2007 |
|---|---|---|
| CN | 101159902 A | 4/2008 |

(Continued)

OTHER PUBLICATIONS

3GPP TS 36.211 V8.5.0, Physical Channels and Modulation, Technical Specification Group Radio Access Network Dec. 31, 2008.
(Continued)

*Primary Examiner* — Kenny Lin
(74) *Attorney, Agent, or Firm* — Oppedahl Patent Law Firm LLC

(57) ABSTRACT

The present invention discloses a multicast broadcast single frequency network subframe. The multicast broadcast single frequency network subframe is used as a physical resource of a user transmission data channel; in the multicast broadcast single frequency network subframe, except symbols of a physical downlink control channel, other symbols adopt the same cyclic prefix as subframe 0 in a local cell. The present invention also discloses a user data channel transmission method and device, and a user physical resource determining device. By using the subframe, the transmission method and device, and the determining device, the performance of the LTE-A system can be improved.

10 Claims, 1 Drawing Sheet

(56) References Cited

U.S. PATENT DOCUMENTS

| | | | |
|---|---|---|---|
| 2012/0014286 A1* | 1/2012 | Wang et al. | 370/254 |
| 2012/0033615 A1* | 2/2012 | Dai et al. | 370/328 |
| 2012/0039232 A1* | 2/2012 | Kwon et al. | 370/312 |

FOREIGN PATENT DOCUMENTS

| | | |
|---|---|---|
| CN | 101184076 A | 5/2008 |
| JP | 2007221743 A | 8/2007 |
| JP | 2010516201 A | 5/2010 |
| KR | 20090049624 A | 5/2009 |
| WO | 2008045628 A2 | 4/2008 |
| WO | 2008123037 A1 | 10/2008 |

OTHER PUBLICATIONS

On OTDOA in LTE Jan. 12-19, 2009.
PDSCH Mapping for CoMP May 4-8, 2009.
Physical Channels and Modulation May 2009.
International Search Report in international application No. PCT/CN2009/075035, mailed on Apr. 1, 2010.
English Translation of the Written Opinion of the International Search Authority in international application No. PCT/CN2009/075035, mailed on Apr. 1, 2010.

\* cited by examiner

MULTICAST BROADCAST SINGLE FREQUENCY NETWORK SUBFRAME, AND USER DATA CHANNEL TRANSMISSION METHOD AND DEVICE

TECHNICAL FIELD

The present invention relates to a mobile communication system, in particular to a multicast broadcast single frequency network subframe used as a user physical resource in a Long-Term Evolution Advance (LTE-Advance) system, and a user data channel transmission method and device.

BACKGROUND

To improve the throughput of cells and conduct interference coordination among cells, a COordinate MultiPoint (COMP) transmission and reception technology of network level is introduced into new-generation wireless communication systems such as the LTE-Advance system and an International Mobile Telecommunication Advance (IMT-Advance) system.

In the 56$^{th}$ 3GPP LTE Conference, two types of reference signals of the LTE-Advanced have been defined: Channel State Information Reference Signal (CSI-RS for short) and DeModulation reference signal (DMRS for short); the former is used for channel measurement and the latter is used for demodulation. Therefore, the common reference signal of LTE is only overhead for LTE-A users, rather than brings additional gain.

If LTE-A dedicated resource is defined, by not transmitting the common reference signals or transmitting part of them, the performance of the LTE-A system can be improved.

SUMMARY

The present invention aims to provide a multicast broadcast single frequency network subframe used as a user physical resource, so as to improve the performance of the LTE-A system.

In order to solve the above technical problem, the present invention provides a multicast broadcast single frequency network subframe which is used as the physical resource of a user transmission data channel; in the multicast broadcast single frequency network subframe, except orthogonal frequency division multiplexing symbols of a physical downlink control channel, other orthogonal frequency division multiplexing symbols adopt a same cyclic prefix as subframe 0 in a local cell.

Preferably, in the case of multi-cell coordination, if cyclic prefixes of all subframe structures of cells involved in the coordination are the same, for the physical resource of multicast broadcast single frequency network type, the cells in a coordination aggregate may adopt a multicast broadcast single frequency network subframe with a frame structure having this cyclic prefix;

if the cyclic prefixes of all subframe structures of cells involved in the coordination are not the same, for the physical resource of multicast broadcast single frequency network type, the cells in the coordination aggregate may adopt a multicast broadcast single frequency network subframe with a frame structure having a long cyclic prefix.

Preferably, the multicast broadcast single frequency network subframe as the physical resource may be any multicast broadcast single frequency network subframe except one numbered as 0, 4, 5 or 9 in the case of Frequency Division Duplexing (FDD); or any multicast broadcast single frequency network subframe except one numbered as 0, 1, 5 or 6 in the case of Time Division Duplexing (TDD);

at most a first two orthogonal frequency division multiplexing (OFDM) symbols of the physical resource may be utilized to transmit the physical downlink control channel of an LTE system user and the physical downlink control channel of an LTE-A system user; a common reference signal may only be mapped on the physical downlink control channel, and a number of antenna ports of the common reference signal may be smaller than or equal to a maximum number of antenna ports of a base station.

Preferably, the physical resource may comprise a physical downlink shared channel.

The present invention aims to provide a user data channel transmission method to improve the performance of the LTE-A system.

In order to solve the above technical problem, the present invention provides a user data channel transmission method, comprising:

using a multicast broadcast single frequency network subframe as a physical resource of a user transmission data channel;

using a cyclic prefix of subframe 0 in a local cell as a cyclic prefix of OFDM symbols except those of a physical downlink control channel in the multicast broadcast single frequency network subframe.

Preferably, in the case of multi-cell coordination, if cyclic prefixes of all subframe structures of cells involved in the coordination are the same, for the physical resource of multicast broadcast single frequency network type, the cells in a coordination aggregate may adopt a multicast broadcast single frequency network subframes with a frame structure having this cyclic prefix;

if the cyclic prefixes of all subframe structures of cells involved in the coordination are not the same, for the physical resource of multicast broadcast single frequency network type, the cells in the coordination aggregate may adopt a multicast broadcast single frequency network subframe with a frame structure having a long cyclic prefix.

Preferably, any multicast broadcast single frequency network subframe except one numbered as 0, 4, 5 or 9 may be used as the physical resource in the case of FDD; any multicast broadcast single frequency network subframe except one numbered as 0, 1, 5 or 6 may be used as the physical resource in the case of TDD;

at most a first two OFDM symbols of the physical resource may be utilized to transmit the physical downlink control channel of an LTE system user and the physical downlink control channel of an LTE-A system user; a common reference signal may only be transmitted on the physical downlink control channel, and a number of antenna ports of the common reference signal may be smaller than a maximum number of antenna ports of a base station.

Preferably, the physical resource may comprise a physical downlink shared channel.

The present invention aims to provide a user physical resource determining device to improve the performance of the LTE-A system.

In order to solve the above technical problem, the present invention provides a user physical resource determining device which comprises a first determining module and a second determining module; wherein the first determining module being configured to determine a multicast broadcast single frequency network subframe as a physical resource of a user transmission data channel;

the second determining module being configured to use a cyclic prefix of subframe 0 in a local cell as a cyclic prefix of OFDM symbols except those of a physical downlink control channel in the multicast broadcast single frequency network subframe.

Preferably, the second determining module may be further configured to determine whether cyclic prefixes of all subframe structures of cells involved in coordination are the same in the case of multi-cell coordination;

the first determining module may be further configured to, when the second determining module determines that the cyclic prefixes of all subframe structures of the cells involved in the coordination are the same, for the physical resource of multicast broadcast single frequency network type, apply the multicast broadcast single frequency network subframe with a frame structure having this cyclic prefix into each cell in a coordination aggregate; or apply the multicast broadcast single frequency network subframe with a frame structure having a long cyclic prefix into each cell in the coordination aggregate for the physical resource of multicast broadcast single frequency network type when the second determining module determines that the cyclic prefixes of all subframe structures of the cells involved in the coordination are not the same.

Preferably, the first determining module may be further configured to use any multicast broadcast single frequency network subframe except one numbered as 0, 4, 5 or 9 in the case of FDD, or any multicast broadcast single frequency network subframe except one numbered as 0, 1, 5 or 6 in the case of TDD, as the physical resource of the user transmission data channel;

at most a first two OFDM symbols of the physical resource may be utilized to transmit the physical downlink control channel of an LTE system user and the physical downlink control channel of an LTE-A system user, a common reference signal may only be mapped on the physical downlink control channel, and a number of antenna ports of the common reference signal may be smaller than or equal to a maximum number of antenna ports of a base station.

The present invention aims to provide a user data channel transmission method to improve the performance of the LTE-A system.

In order to solve the above technical problem, the present invention provides a user data channel transmission device which comprises a first determining module and a second determining module; wherein the first determining module is configured to determine a multicast broadcast single frequency network subframe as a physical resource of a user transmission data channel;

the second determining module is configured to use a cyclic prefix of subframe 0 in a local cell as a cyclic prefixes of OFDM symbols except those of a physical downlink control channel in the multicast broadcast single frequency network subframe.

Preferably, the second determining module may be further configured to determine whether cyclic prefixes of all subframe structures of cells involved in coordination are the same in the case of multi-cell coordination;

the first determining module may be further configured to, when the second determining module determines that the cyclic prefixes of all subframe structures of the cells involved in the coordination are the same, for the physical resource of multicast broadcast single frequency network type, apply the multicast broadcast single frequency network subframe with a frame structure having this cyclic prefix into each cell in a coordination aggregate; or apply the multicast broadcast single frequency network subframe with a frame structure having a long cyclic prefix into each cell in the coordination aggregate for the physical resource of multicast broadcast single frequency network type when the second determining module determines that the cyclic prefixes of all subframe structures of the cells involved in the coordination are not the same.

Preferably, the first determining module may be further configured to use any multicast broadcast single frequency network subframe except one numbered as 0, 4, 5 or 9 in the case of FDD, or any multicast broadcast single frequency network subframe except one numbered as 0, 1, 5 or 6 in the case of TDD, as the physical resource of the user transmission data channel;

at most a first two OFDM symbols of the physical resource may be utilized to transmit the physical downlink control channel of an LTE system user and the physical downlink control channel of an LTE-A system user, a common reference signal may only be transmitted on the physical downlink control channel, and a number of antenna ports of the common reference signal may be smaller than a maximum number of antenna ports of a base station.

Compared with the prior art, for the LTE-A physical resource of MBSFN subframe type, OFDM symbols except those of the PDCCH adopt the same cyclic prefix as that of subframe 0, so that the local cell has the unified cyclic prefix, thereby maintaining the coverage consistency. When the parameters of the physical layer are selected, because the unified cyclic prefix is adopted, the parameter consistency of the system is guaranteed. The technical scheme of the present invention is especially suitable for COMP application.

DETAILED DESCRIPTION

Figure 1:
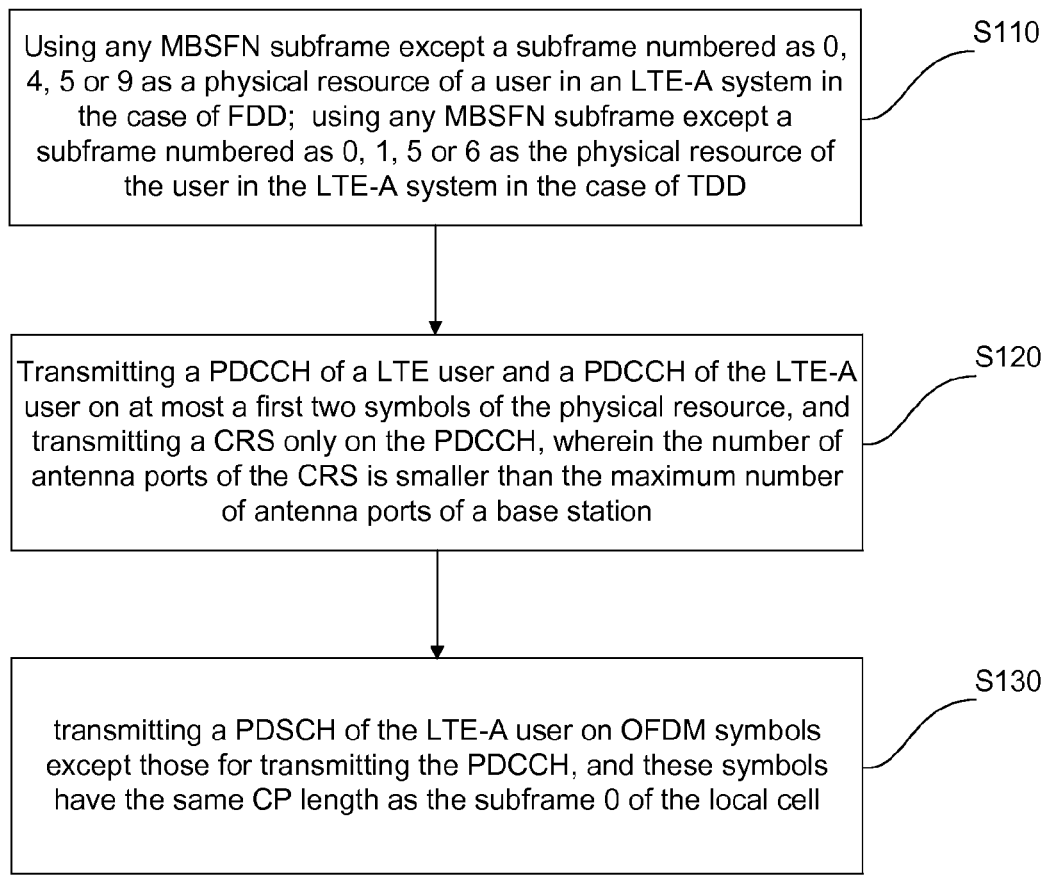
FIG. 1 is a flow diagram of a COMP transmission and reception method according to the embodiment of the present invention.

The detailed description of the present invention will be described with reference to the attached figures and the embodiment, thereby the realization process of the present invention will be fully understood.

In order to make the LTE-A physical resource not leave too much influence to the LTE user, a Multicast Broadcast Single Frequency Network (MBSFN) subframe may be used as the physical resource of the LTE user. The LTE User Equipment (UE) will not receive the information of the MBSFN subframe when the user equipment determines that the MBSFN subframe does not belong to the physical resource it shall receive. The LTE user equipment identifies that the MBSFN subframe is the physical resource of the LTE-A user according to the signaling of LTE-A, further reads the resource allocation indication, and receives its signals on the physical resource.

The LTE-A system may transmit a Physical Downlink Shared CHannel (PDSCH) of the LTE-A user in the form of MBSFN subframe, and the common reference signal (CRS) are inserted into at most a first two symbols of the MBSFN to transmit a Physical Downlink Control CHannel (PDCCH).

3GPP TS36.211 6.5 of LTE Standard has specified that a first two symbols of the MBSFN subframe use the same cyclic prefix type as subframe 0, while in LTE Standard, all OFDM symbols except those of PDCCH adopt long cyclic prefix. Because the LTE-A user transmits unicast service on the LTE-A physical resource of MBSFN subframe type, the long cyclic prefix frame structure can not apply to all the application scenarios.

The concept of the present invention is as follows: when the MBSFN subframe is used as the physical resource of the user in the LTE-A system, in the MBSFN subframe, except symbols of PDCCH, other symbols adopt the same Cyclic Prefix (CP) as the subframe 0 of the local cell, wherein the CP includes normal CP or long CP.

In the case of multi-cell coordination, if the cyclic prefixes of all subframe structures of cells involved in the coordination are the same, for the LTE-A physical resource of MBSFN type, the cells in the coordination aggregate adopt a MBSFN subframe with a frame structure having this cyclic prefix, wherein the CP includes normal CP or long CP.

In the case of multi-cell coordination, if the cyclic prefixes of all subframe structures of cells involved in the coordination are not the same, for the LTE-A physical resource of MBSFN type, the cells in the coordination aggregate adopt a MBSFN subframe with a frame structure having a long cyclic prefix.

In this way, on the LTE-A physical resource of MBSFN subframe type, except OFDM symbols of PDCCH, other symbols adopt the same cyclic prefix (CP) as the subframe 0, so that a local cell has a unified cyclic prefix, thereby being favorable for maintaining the coverage consistency (long cyclic prefix is for the scenario of broader coverage). COordinate MultiPoint (COMP) transmission and reception is mainly used for cell-edge users, therefore, its transmission delay may be relatively long. If the cyclic prefixes of all subframe structure of cells involved in the coordination are not the same, the coverage of the coordinate cells can be ensured by adopting long cyclic prefix.

When parameters of a physical layer are selected, the parameter aggregate of long cyclic prefix and the parameter aggregate of normal cyclic prefix will be different. For example, in table 6.9.3-1 of 3GPP TS36.211 of LTE Standard, the transmission period of PHICH (Physical HARQ Indicator Channel) with a long cyclic prefix frame structure is once per subframe, while that of PHICH with normal cyclic prefix frame structure is twice per subframe; therefore the use of unified cyclic prefix can ensure the parameter consistency of the system.

FIG. 1 is a flow diagram of a COMP transmission and reception method according to the embodiment of the present invention. As shown in FIG. 1, the method mainly comprises the following steps.

Step S110: using any MBSFN subframe except a subframe numbered as 0, 4, 5 or 9 as a physical resource of a user in an LTE-A system in the case of FDD; using any MBSFN subframe except a subframe numbered as 0, 1, 5 or 6 as the physical resource of the user in the LTE-A system in the case of TDD.

Step S120: transmitting a PDCCH of a LTE user and a PDCCH of the LTE-A user on at most a first two symbols of the physical resource, and transmitting a CRS only on the PDCCH, wherein the number of antenna ports of the CRS is smaller than the maximum number of antenna ports of a base station. The number of the CRS is two in this embodiment (the number of CRS may also be one in other embodiments). The CRS can be configured according to Table 1, which is a table of mapping relation between the number of CRS transmission ports and the actual number of antennas.

TABLE 1

| | Actual Number of Antennas = 1 | Actual Number of Antennas = 2 | Actual Number of Antennas = 4 | Actual Number of Antennas = 8 |
|---|---|---|---|---|
| Number of CRS | $N_{Rel\text{-}8\ CRS} = 1$ | $N_{Rel\text{-}8\ CRS} = 1$ | $N_{Rel\text{-}8\ CRS} = 1$ | $N_{Rel\text{-}8\ CRS} = 1$ |
| Number of CRS | — | $N_{Rel\text{-}8\ CRS} = 2$ | $N_{Rel\text{-}8\ CRS} = 2$ | $N_{Rel\text{-}8\ CRS} = 2$ |
| Number of CRS | — | — | $N_{Rel\text{-}8\ CRS} = 4$ | $N_{Rel\text{-}8\ CRS} = 4$ |

In table 1, $N_{Rel\text{-}8\ CRS}$ refers to the number of CRS transmitted by LTE.

Step S130: transmitting a PDSCH of the LTE-A user on OFDM symbols except those for transmitting the PDCCH, and these symbols have the same CP length as the subframe 0 of the local cell.

In the case of multi-cell coordination, if the cyclic prefixes of all subframe structures of the cells involved in the coordination are the same, for the LTE-A physical resource of MBSFN type, the cells in the coordination aggregate adopt a MBSFN subframe with a frame structure having this cyclic prefix.

In the case of multi-cell coordination, if the cyclic prefixes of all subframe structures of the cells involved in the coordination are not the same, for the LTE-A physical resource of MBSFN type, the cells in the coordination aggregate adopt a MBSFN subframe with a frame structure having a long cyclic prefix.

Figure 2:
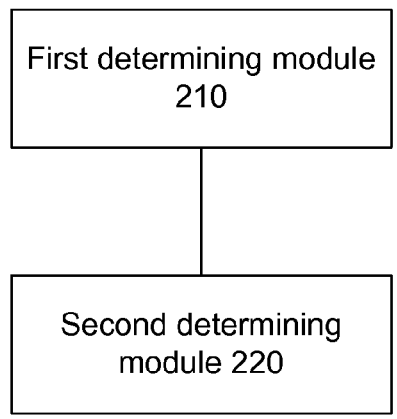
FIG. 2 is a composition diagram of a user physical resource determining device in the LTE-A system according to the embodiment of the present invention.

FIG. 2 is a composition diagram of a user physical resource determining device in the LTE-A system according to the embodiment of the present invention. As shown in FIG. 2, the device mainly comprises a first determining module 210 and a second determining module 220, wherein the first determining module 210 is configured to determine a MBSFN subframe as a physical resource of a user transmission data channel in an LTE-A system.

The second determining module 220 is configured to use the CP of subframe 0 in the local cell as the cyclic prefix of symbols except those of the PDCCH in the MBSFN subframe as the physical resource.

The second determining module 220 determines whether the cyclic prefixes of all subframe structures of the cells involved in the coordination are the same in the case of multi-cell coordination. The first determining module 210 is further configured to, when the second determining module 220 determines that the CPs of all subframe structures of the cells involved in the coordination are the same, for the physical resource of MBSFN type, apply the MBSFN subframe with this CP structure into each cell in the coordination aggregate; or apply the MBSFN subframe with a long CP into each cell in the coordination aggregate for the physical resource of MBSFN type when the second determining module 220 determines that the CPs of all subframe structures of the cells involved in the coordination are not the same.

The first determining module 210 uses any MBSFN subframe except the one numbered as 0, 4, 5 or 9 in the case of FDD, or any MBSFN subframe except the one numbered as 0, 1, 5 or 6 in the case of TDD, as the physical resource of the user transmission data channel. At most the first two symbols of the physical resource are utilized to transmit the PDCCH of the LTE system user and the PDCCH of LTE-A system user, the common reference signal is only mapped on the PDCCH, and the number of the antenna ports of the common reference signal is smaller than the maximum number of the antenna ports of the base station.

The above descriptions are only preferred embodiments of the present invention and are not used for restricting the protection scope of the present invention; any modifications or replacements easily occurred to a person skilled in the art within the technical scope disclosed by the present invention shall be included within the protection scope of the present invention. Therefore, the protection scope of the present invention shall be referred to the protection scope of the claims.

The invention claimed is:

1. A user data channel transmission method, comprising:
using, by a user data channel transmission device in a Long-Term Evolution Advance, LTE-A, system, a multicast broadcast single frequency network subframe as a physical resource of a user transmission data channel;
using, by the user data channel transmission device, a cyclic prefix of subframe 0 in a local cell as a cyclic prefix of symbols except those of a physical downlink control channel in the multicast broadcast single frequency network subframe.

2. The transmission method according to claim 1, wherein in the case of multi-cell coordination, if cyclic prefixes of all subframe structures of cells involved in the coordination are the same, for the physical resource of multicast broadcast single frequency network type, adopting a multicast broadcast single frequency network subframe with a frame structure having this cyclic prefix by the cells in a coordination aggregate;
if the cyclic prefixes of all subframe structures of cells involved in the coordination are not the same, for the physical resource of multicast broadcast single frequency network type, adopting a multicast broadcast single frequency network subframe with a frame structure having a long cyclic prefix by the cells in the coordination aggregate.

3. The transmission method according to claim 1, wherein using any multicast broadcast single frequency network subframe except one numbered as 0, 4, 5 or 9 as the physical resource in the case of FDD; using any multicast broadcast single frequency network subframe except one numbered as 0, 1, 5 or 6 is used the physical resource in the case of TDD;
utilizing at most a first two symbols of the physical resource to transmit the physical downlink control channel of an LTE system user and the physical downlink control channel of an LTE-A system user; transmitting a common reference signal only on the physical downlink control channel, and a number of antenna ports of the common reference signal is smaller than a maximum number of antenna ports of a base station.

4. The transmission method according to claim 1, wherein the physical resource comprises a physical downlink shared channel.

5. A user physical resource determining device in a Long-Term Evolution Advance, LTE-A, system, comprising a first determining module and a second determining module; wherein
the first determining module being configured to determine a multicast broadcast single frequency network subframe as a physical resource of a user transmission data channel;
the second determining module being configured to use a cyclic prefix of subframe 0 in a local cell as a cyclic prefix of symbols except those of a physical downlink control channel in the multicast broadcast single frequency network subframe;
wherein the first determining module and the second determining module are each the result of execution on a processor of software stored in a memory.

6. The determining device according to claim 5, wherein the second determining module is further configured to determine whether cyclic prefixes of all subframe structures of cells involved in coordination are the same in the case of multi-cell coordination;
the first determining module is further configured to, when the second determining module determines that the cyclic prefixes of all subframe structures of the cells involved in the coordination are the same, for the physical resource of multicast broadcast single frequency network type, apply the multicast broadcast single frequency network subframe with a frame structure having this cyclic prefix into each cell in a coordination aggregate; or
apply the multicast broadcast single frequency network subframe with a frame structure having a long cyclic prefix into each cell in the coordination aggregate for the physical resource of multicast broadcast single frequency network type when the second determining module determines that the cyclic prefixes of all subframe structures of the cells involved in the coordination are not the same.

7. The determining method according to claim 5, wherein the first determining module is further configured to use any multicast broadcast single frequency network subframe except one numbered as 0, 4, 5 or 9 in the case of FDD, or any multicast broadcast single frequency network subframe except one numbered as 0, 1, 5 or 6 in the case of TDD, as the physical resource of the user transmission data channel;
at most a first two symbols of the physical resource are utilized to transmit the physical downlink control channel of an LTE system user and the physical downlink control channel of an LTE-A system user, a common reference signal is only mapped on the physical downlink control channel, and a number of antenna ports of the common reference signal is smaller than or equal to a maximum number of antenna ports of a base station.

8. A user data channel transmission device in a Long-Term Evolution Advance, LTE-A, system, comprising a first determining module and a second determining module; wherein
the first determining module being configured to determine a multicast broadcast single frequency network subframe as a physical resource of a user transmission data channel;
the second determining module being configured to use a cyclic prefix of subframe 0 in a local cell as a cyclic prefix of symbols except those of a physical downlink control channel in the multicast broadcast single frequency network subframe;
wherein the first determining module and the second determining module are each the result of execution on a processor of software stored in a memory.

9. The transmission device according to claim 8, wherein the second determining module is further configured to determine whether cyclic prefixes of all subframe structures of cells involved in coordination are the same in the case of multi-cell coordination;
the first determining module is further configured to, when the second determining module determines that the cyclic prefixes of all subframe structures of the cells involved in the coordination are the same, for the physical resource of multicast broadcast single frequency network type, apply the multicast broadcast single frequency network subframe with a frame structure having this cyclic prefix into each cell in a coordination aggregate; or apply the multicast broadcast single frequency network subframe with a frame structure having a long cyclic prefix into each cell in the coordination aggregate for the physical resource of multicast broadcast single frequency network type when the second determining module determines that the cyclic prefixes of all subframe structures of the cells involved in the coordination are not the same.

10. The transmission device according to claim 8, wherein the first determining module is further configured to use any multicast broadcast single frequency network subframe except one numbered as 0, 4, 5 or 9 in the case of FDD, or any multicast broadcast single frequency network subframe except one numbered as 0, 1, 5 or 6 in the case of TDD, as the physical resource of the user transmission data channel;

at most a first two symbols of the physical resource are utilized to transmit the physical downlink control channel of an LTE system user and the physical downlink control channel of an LTE-A system user, a common reference signal is only transmitted on the physical downlink control channel, and a number of antenna ports of the common reference signal is smaller than or equal to a maximum number of antenna ports of a base station.

* * * * *